(12) United States Patent
Sugiyama (10) Patent No.: US 9,308,846 B2
(45) Date of Patent: Apr. 12, 2016

(54) SEAT CUSHION AND VEHICLE SEAT

(75) Inventor: Shinji Sugiyama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 236 days.

(21) Appl. No.: 14/007,684

(22) PCT Filed: Mar. 29, 2012

(86) PCT No.: PCT/JP2012/058416
§ 371 (c)(1),
(2), (4) Date: Sep. 26, 2013

(87) PCT Pub. No.: WO2012/133675
PCT Pub. Date: Oct. 4, 2012

(65) Prior Publication Data
US 2014/0021769 A1    Jan. 23, 2014

(30) Foreign Application Priority Data

Mar. 31, 2011  (JP) .................................. 2011-080769
Mar. 31, 2011  (JP) .................................. 2011-080770

(51) Int. Cl.
  *B60N 2/64*  (2006.01)
  *B60N 2/70*  (2006.01)
  *B60N 2/72*  (2006.01)

(52) U.S. Cl.
  CPC  *B60N 2/64* (2013.01); *B60N 2/646* (2013.01); *B60N 2/7094* (2013.01); *B60N 2/72* (2013.01)

(58) Field of Classification Search
  CPC ............ B60N 2/64; B60N 2/646; B60N 2/72; B60N 2/7094
  USPC ............. 297/452.49, 452.52, 452.54, 452.55, 297/452.58
  See application file for complete search history.

(56) References Cited

U.S. PATENT DOCUMENTS 7,137,669 B2 *  11/2006  Nagayama ............... 297/452.49
2010/0102615 A1   4/2010  Yamauchi

FOREIGN PATENT DOCUMENTS

| FR | 2 861 660 A1 | 5/2005 |
| JP | 62-148150 U | 9/1987 |
| JP | 03-29041 U | 3/1991 |
| JP | 09-117346 A | 5/1997 |

(Continued)

OTHER PUBLICATIONS

Extended European Search Report issued for EP 12764185.0 (Aug. 5, 2014).

(Continued)

*Primary Examiner* — Anthony D Barfield
(74) *Attorney, Agent, or Firm* — Drinker Biddle & Reath LLP (57) ABSTRACT

A seat cushion includes a seat base frame, a cushion pad disposed on the seat base frame, and a skin material that covers the seat base frame and the cushion pad. The seat base frame includes a pair of side frames that extends in the front to back direction, a front elastic member that is installed in the pair of side frames and is in contact with the cushion pad, and a rear elastic member that is disposed while being separated from the front elastic member by a predetermined distance and is in contact with the cushion pad, in which a pad contact surface of the front elastic member is disposed to be inclined rearward with respect to a horizontal plane and a pad contact surface of the rear elastic member is disposed to be inclined forward with respect to the horizontal plane or to be parallel thereto.

15 Claims, 7 Drawing Sheets (56) References Cited

FOREIGN PATENT DOCUMENTS

| | | |
|---|---|---|
| JP | 2004-255208 A | 9/2004 |
| JP | 2005-000424 A | 1/2005 |
| JP | 2006-280432 A | 10/2006 |
| JP | 2006-290171 A | 10/2006 |
| JP | 2008-049804 A | 3/2008 |

OTHER PUBLICATIONS

Office Action issued for JP 2011-080770 (Oct. 21, 2014).
Office Action issued for CN 201280021622.1 (Jun. 30, 2015).

* cited by examiner

SEAT CUSHION AND VEHICLE SEAT

CROSS REFERENCE TO RELATED APPLICATIONS

This application is the U.S. national phase of the International Patent Application No. PCT/JP2012/058416, filed Mar. 29, 2012, which claims the benefit of the following Japanese Patent Applications: Application No. 2011-080769, filed Mar. 31, 2011, and Application No. 2011-080770, filed Mar. 31, 2011, the entire content of all being incorporated herein by reference.

BACKGROUND

Disclosed herein is a seat cushion and a vehicle seat, and particularly, a seat cushion and a vehicle seat that easily follow a contour of an occupant's body, have satisfactory vibration characteristics, and provide an excellent sitting comfort.

Generally, in a vehicle seat, a seat portion (seat cushion) supporting the buttocks and thighs of an occupant is provided in a manner that a cushion pad is placed on a seat base frame and is covered with a skin material (trim cover). In such a seat cushion, various structures have been proposed in order to provide a satisfactory sitting comfort for the occupant.

As a factor that influences the sitting comfort, the contour following capability (fit comfort) of the seat cushion with respect to the occupant or the vibration characteristics in the vehicle running state may be exemplified. In particular, the vibration characteristics may easily influence the occupant sitting on the seat cushion for a long period of time.

In a vehicle such as an automobile or an electrical train, a vibration is generated from a floor surface in a vehicle running state. When the vibration generated at this time is transmitted to the vehicle seat, the seat cushion is vibrated at a low frequency (about 3 to 4 Hz). As a result, since the occupant's body resonates with the seat cushion, the sitting comfort may be degraded.

To address this, as a technique of reducing a vibration in a low-frequency bandwidth generated by the seat cushion in the vehicle running state and hence ensuring a satisfactory sitting comfort of the seat cushion, a technique of providing a seat suspension device is proposed, but there is a problem of complex structure and size increase.

As a technique of ensuring the satisfactory sitting comfort of the seat cushion, for example, a technique is known which reduces a vibration transmitted from a vehicle body and reduces a resonance. In such a technique, specifically, a seat cushion may be exemplified in which a pan frame is provided and a plurality of S-shaped springs are installed at positions corresponding to the buttocks of the occupant in the pan frame. When the seat cushion has the above-described configuration, a satisfactory cushion property may be obtained by the elastic deformation of the S-shaped springs and the cushion pad. As a result, it is possible to reduce the vibration transmitted from the vehicle body in the vehicle running state.

Regarding the seat cushion having a configuration in which such a pan frame is provided with the S-shaped springs, Japanese Patent Document No. 1997(H09)-117346 A ("the '346 Document") discloses a seat cushion which further reduces a vibration. In the seat cushion disclosed in the '346 Document, a seat cushion is disclosed in which a recessed buttocks receiving portion (air room) is formed in a pan frame at a position corresponding to the buttocks of the occupant. In the seat cushion, the air room is a space which is formed between the pan frame and a cushion pad (described as a "seat pad" in the '346 Document) placed on the pan frame, and an orifice communicating with the air room is formed in a wall surface of the pan frame.

By the above-described configuration, in the seat cushion disclosed in the '346 Document, air satisfactorily flows out of the air room with the compressive deformation of the cushion pad, and hence the seat cushion itself may reduce the vibration.

Further, as a technique involved with the seat cushion having a satisfactory sitting comfort, a technique of reducing a sitting pressure at a specific position influencing a sitting comfort is disclosed in Japanese Patent Document No 2004-255208 A ("the '208 Document").

In the seat cushion (described as a "sitting pressure reduction seat" in the '208 Document) disclosed in the '208 Document, a hole or a concave portion is formed directly below an ischial tuberosity of an occupant in a pan frame to decrease the pressure directly below the ischial tuberosity (the pressure of the portion with the highest sitting pressure).

In the seat cushion disclosed in the '346 Document, since the S-shaped springs are installed in the pan frame to be located at the positions corresponding to the buttocks of the occupant, the cushion pad may easily follow the human body contour of the occupant. Then, since the S-shaped springs are installed above the air room, the vibration may be reduced without separately providing the suspension device or the like.

However, in the seat cushion of the '346 Document, the pan frame as the seat base frame is provided in the entire surface of the seat base frame, and the pan frame needs to be disposed to the portion corresponding to not only the thighs of the occupant but also the buttocks thereof. As a result, a problem arises that the weight is large. Accordingly, it is desirable to devise a seat cushion which further improves a sitting comfort by a simple and light-weight configuration of the seat cushion and high contour following capability to an occupant.

Further, in the '208 Document, since the cushion pad (described as a "cushion member" in the '208 Document) is placed on the pan frame provided with the hole or the concave portion, the sitting pressure (the ischial pressure) is reduced. However, since the upward biasing force is not exerted when the cushion pad is deflected by the load of the occupant, a problem arises that the contour following capability to the occupant's body is not satisfactory.

Accordingly, a technique has been desired which provides a seat cushion that has high contour following capability to an occupant's body (that is, a satisfactory fit comfort), has a low sitting ischial pressure, and has a satisfactory sitting comfort.

SUMMARY

It is an object of various embodiments of the present invention to provide a seat cushion and a vehicle seat which provide a satisfactory sitting comfort with a simple and light-weight configuration and high contour following capability to an occupant. Further, it is another object to provide a seat cushion and a vehicle seat which provide a satisfactory sitting comfort due to high contour following capability to a human body of an occupant and a decreased sitting ischial pressure. Furthermore, it is still another object to provide a seat cushion and a vehicle seat which provide a satisfactory sitting comfort due to satisfactory vibration characteristics.

Accordingly, the above-described problems are solved by a seat cushion comprising: a seat base frame; a cushion pad which is placed on the seat base frame; and a skin material which covers the seat base frame and the cushion pad, in which the seat base frame comprises a pair of side frames that extends in the front to back direction, a front elastic member that is installed in the pair of side frames and is in contact with the cushion pad, and a rear elastic member that is separated from the front elastic member by a predetermined distance and is in contact with the cushion pad, in which a pad contact surface of the front elastic member is inclined rearward with respect to a horizontal plane, and in which a pad contact surface of the rear elastic member is inclined forward with respect to the horizontal plane or to be parallel thereto.

In this way, in the seat cushion, two elastic members are provided to be laid across the side frames. Then, the elastic members (the front elastic member and the rear elastic member) provided at two positions support the cushion pad placed on the seat base frame. At this time, the pad contact surface (that is, the upper surface of the front elastic member) of the front elastic member is disposed to be inclined rearward with respect to the horizontal plane (the rear side of the pad contact surface is inclined downward). Further, the pad contact surface (that is, the upper surface of the rear elastic member) of the rear elastic member is disposed to be inclined forward with respect to the horizontal plane (the front side of the pad contact surface is inclined downward) or to be horizontal.

Since the buttocks of the occupant are curved and bulge downward, the buttocks push the cushion pad downward while deflecting the cushion pad downward during the sitting operation. At this time, in the contact surface of the cushion pad with respect to the buttocks of the occupant, the front and rear sides of the buttocks are inclined upward.

Accordingly, in the seat cushion, when the occupant sits on the seat cushion, the upward biasing force is exerted on the cushion pad by the front elastic member inclined rearward and the rear elastic member inclined forward, and hence the cushion pad easily follows the buttocks of the occupant. Accordingly, a satisfactory sitting comfort may be obtained.

Further, since the front elastic member and the rear elastic member are disposed while being separated from each other, the ischial tuberosity of the occupant may be located between the front elastic member and the rear elastic member. As a result, the seat cushion may provide a satisfactory sitting comfort for the occupant by reducing the ischial pressure.

Further, since the light-weight elastic member is used as the configuration in which the cushion pad follows the buttocks of the occupant without using a large pan frame, the weight of the seat cushion does not increase.

At this time, when a degree of an acute angle formed between the pad contact surface of the front elastic member and the horizontal plane is denoted by $\theta_1$ and a degree of an acute angle formed between the pad contact surface of the rear elastic member and the horizontal plane is denoted by $\theta_2$, a relation of $\theta_1 > \theta_2$ may be established.

In this way, since the rearward inclined angle $\theta_1$ of the front elastic member is set to be larger than the forward inclined angle $\theta_2$ of the rear elastic member, the cushion pad may easily follow the buttocks of the occupant.

Further, at this time, when a ratio between $\theta_1$ and $\theta_2$ is denoted by $\theta_2/\theta_1$, a relation of $0 \leq \theta_2/\theta \leq 0.18$ may be established.

In this way, since the ratio between $\theta_2$ and $\theta_1$ is set in the above-described range, the cushion pad may further easily follow the buttocks of the occupant in consideration of the deflection amount of the cushion pad.

Moreover, the $\theta_1$ may be in the range of 17 to 21°, and $\theta_2$ may be in the range of 0 to 3°.

In this way, when the values of $\theta_1$ and $\theta_2$ are set in the above-described range, the cushion pad may easily follow the contour of the buttocks of the occupant and the occupant does not feel any difference in height by the elastic member or does not feel the sense of hitting the bottom surface. Further, when $\theta_2$ is set to the above-described value, the thickness of the cushion pad may be ensured without decreasing the thickness of the cushion pad too much compared to the case where $\theta_2$ is set to be larger than the above-described value, and hence the more satisfactory sitting comfort may be provided for the occupant.

At this time, the seat base frame may further include a plate-shaped frame installed in the pair of side frames, and the plate-shaped frame may be disposed in front of the front elastic member.

In this way, when the seat base frame further includes the plate-shaped frame and the plate-shaped frame is disposed in front of the front elastic member, the thighs of the occupant may be supported. Accordingly, in the seat cushion with the above-described configuration, the occupant contact portion (the buttocks and the thigh) may be reliably supported and the satisfactory sitting comfort may be obtained. Further, since the plate-shaped frame is provided only in the portion corresponding to the thigh, the weight of the seat cushion does not increase too much.

Further, a rear end of the plate-shaped frame may be provided to satisfy a relation of $0.73 \leq \alpha/\beta \leq 1.09$ when a height from the rear end to a hip point of a three-dimensional mannequin based on SAE International standard SAE J-826 version 200811, published Nov. 11, 2008, "Devices for Use in Defining and Measuring Vehicle Seating Accommodation" (hereinafter "SAE J-826") is denoted by $\alpha$, a distance from the rear end to the hip point in the front to back direction is denoted by $\beta$, and a ratio between the $\alpha$ and the $\beta$ is denoted by $\alpha/\beta$.

In this way, in the seat cushion described herein, the rear end of the plate-shaped frame is disposed at the above-described position. For this reason, the seat cushion according to various embodiments of the present invention may have an extremely light weight compared to the seat cushion in which the pan frame is used in the entire surface of the seat base frame and the pan frame is provided from the position of the thighs of the occupant to the buttocks thereof.

However, when only the area of the pan frame is decreased, the weight of the seat base frame may be decreased, but the range in which the pan frame supports the occupant is not sufficient. As a result, there is a concern that the vibration characteristics may be degraded.

In the seat cushion of various embodiments of the present invention, the rear end of the pan frame is disposed at the above-described position, and hence a seat cushion having a satisfactory vibration characteristic and a light weight may be provided.

More specifically, in this seat cushion, the position of the rear end of the pan frame is set as described above. Accordingly, the resonance magnification with respect to the vibration transmitted from the vehicle is reduced compared to the seat cushion in which the pan frame does not have the above-described configuration, and hence the resonance frequency further increases. As a result, since the resonance frequency of the seat cushion is shifted from the resonance zone of the human body of the occupant, the vibration of the vehicle is not easily transmitted to the occupant. Accordingly, the seat cushion may be decreased in weight and improve the vibration characteristics. Thus, a satisfactory sitting comfort may be provided for the occupant.

At this time, the $\alpha$ may be in the range of 85 to 105 mm, and the $\beta$ may be in the range of 96 to 116 mm.

In this way, since the rear end of the plate-shaped frame is disposed in the above-described range, the vibration characteristics are further improved.

Accordingly, the above-described problems are solved by a vehicle seat including any one of the above-described seat cushions and a seatback.

In this way, the vehicle seat described herein has the above-described light-weight and simple configuration, and includes the seat cushion which provides a satisfactory sitting comfort. Accordingly, the vehicle seat may be provided which has a light weight as a whole and has a satisfactory sitting comfort.

Since the light-weight elastic member biases the cushion pad upward with a predetermined angle, the seat cushion may be provided which causes the cushion pad to easily follow contour of the buttocks of the occupant with a simple and light-weight configuration and obtains a satisfactory sitting comfort. Further, since the front elastic member and the rear elastic member are disposed while being separated from each other in the front to back direction, the ischial pressure may be reduced, and hence the seat cushion with a satisfactory sitting comfort may be provided.

Accordingly, since the elastic members are disposed to easily follow the shapes of the buttocks of the occupant, the cushion pad may further easily follow the buttocks contour of the occupant. Accordingly, the seat cushion with a satisfactory sitting comfort may be provided.

Accordingly, since the elastic members are disposed considering the deflection of the cushion pad, the cushion pad may further easily follow the buttocks of the occupant, and hence the sitting comfort may be improved.

Accordingly, since the elastic members are attached so that the occupant does not feel any height difference or does not feel the sense of hitting the bottom surface due to the elastic members, the seat cushion with a satisfactory sitting comfort may be provided. Further, the satisfactory sitting comfort may be provided for the occupant without thinning the cushion pad even when the cushion pad is disposed at the rear side of the seat cushion.

Accordingly, since the thighs may be also reliably supported when the occupant sits on the seat cushion, the sitting comfort is further improved. Further, since the plate-shaped frame is provided only in the portion corresponding to the thigh, the seat cushion may be provided which has a satisfactory sitting comfort and a light weight.

Accordingly, since the seat cushion has a light-weight and simple configuration and has a satisfactory sitting comfort, the vehicle seat may be provided which has a light weight and a satisfactory sitting comfort.

Accordingly, since the resonance of the occupant's body with respect to the vibration from the vehicle body does not easily occur when the occupant sits on the seat cushion, the vibration characteristics are satisfactory, and hence the seat cushion may be provided which obtains a satisfactory sitting comfort.

BRIEF DESCRIPTION OF THE DRAWINGS

The following drawing figures illustrate various aspects of embodiments of the invention.

DETAILED DESCRIPTION

Hereinafter, an embodiment of the present invention will be described by referring to the drawings. Furthermore, the components, the arrangements, and the like to be described later do not limit the present invention and may be modified into various forms without departing from the spirit of the present invention. Further, in the present specification, a vehicle indicates a ground running conveyance such as an automobile and a train with wheels and a conveyance such as an airplane and a ship moving in a place other than a ground. That is, the vehicle indicates a conveyance to which a seat is attachable. Further, a normal sitting load includes a sitting impact generated by a sitting operation and an acceleration load generated by a sudden starting operation of a conveyance.

Figure 1:
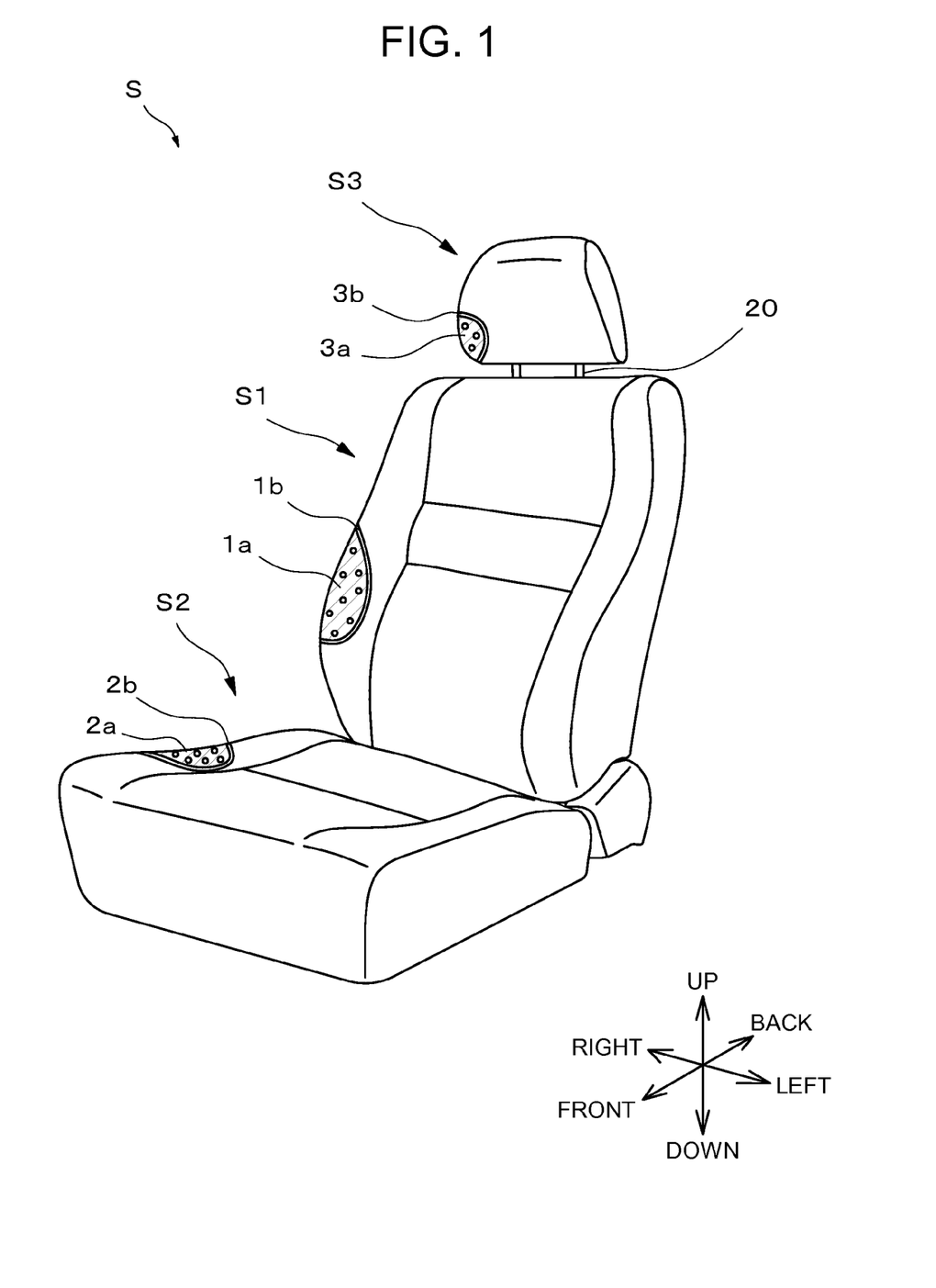
FIG. 1 is a schematic perspective view illustrating a vehicle seat according to an embodiment of the present invention.

Further, the terms representing the directions in the present specification are defined as the respective directions of FIG. 1. That is, the right and left direction indicates the width direction of the vehicle seat, the left side when viewed from the sitting occupant indicates the left direction, and the right side when viewed from the sitting occupant indicates the right direction. Further, the front direction indicates the front side when viewed from the sitting occupant, and the back direction indicates the rear side when viewed from the sitting occupant.

Further, in the present specification, the "hip point" and the "H point" indicate the rotation center point that connects a torso and each thigh of a three-dimensional mannequin based on SAE J-826 (SAE-3 DM manufactured by ITOU SEIKI). Further, the "ischial tuberosity" indicates a portion which is located at the lowermost side of a pelvis of an occupant.

FIGS. 1 to 5 relate to an embodiment of the present invention. FIGS. 6 to 9 relate to seat cushions according to Example and Comparative Example of the present invention.

Referring to FIGS. 1 to 5, a vehicle seat S according to an embodiment will be described.

As illustrated in FIG. 1, the vehicle seat S includes a seatback S1 (back portion), a seat cushion S2, and a headrest S3, and the seatback S1 and the seat cushion S2 are formed in a manner that cushion pads 1a and 2a are placed on seat frames and are covered with skin materials 1b and 2b. Furthermore, the headrest S3 is formed in a manner that a pad material 3a is disposed on a head core (not illustrated) and is covered with a skin material 3b. Further, the reference numeral 20 indicates a headrest pillar which supports the headrest S3.

The seat frame of the vehicle seat S includes a seat back frame (not illustrated) which forms the seatback S1 and a seat base frame F which forms the seat cushion S2.

As described above, the seatback S1 is formed in a manner that the cushion pad 1a is placed on the seat back frame and is covered with the skin material 1b from the upside of the cushion pad 1a, and is used to support a back of an occupant C from the rear side.

As described above, the seat cushion S2 is formed in a manner that the cushion pad 2a is placed on the seat base frame F and is covered with the skin material 2b from the upside of the cushion pad 2a, and is used to support the occupant C from the downside. The seat base frame F is supported by leg portions (not illustrated), and inner rails are attached to the leg portions, so that the position of the seat base frame may be adjusted in a slidable manner in the front to back direction by the sliding movement between the inner rails and outer rails provided in a vehicle body floor.

Further, the rear end of the seat base frame F is connected to a seat back frame (not illustrated) through a reclining mechanism (not illustrated).

Figure 2:
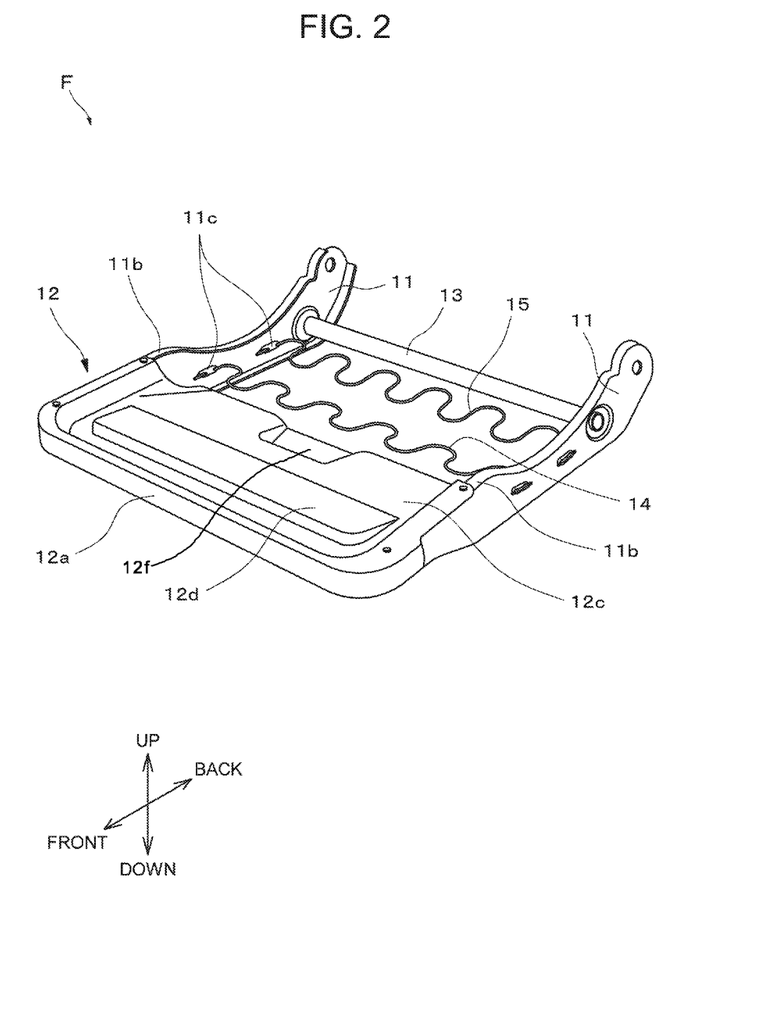
FIG. 2 is a schematic perspective view illustrating a seat base frame according to an embodiment of the present invention.

In this embodiment, the seat base frame F is substantially formed in a rectangular shape as illustrated in FIG. 2, and includes a pair of side frames 11 which are separated from each other in the right and left direction, a pan frame 12 which serves as a plate-shaped frame installed at the front side (the front ends) of the side frames 11, a member pipe 13 which serves as a connection member disposed at the rear side of the side frames 11, a front spring 14 which serves as a front elastic member installed in the side frames 11, and a rear spring 15 which serves as a rear elastic member.

Furthermore, the pan frame 12 and the member pipe 13 are both installed in the side frames 11, and connect the side frames 11 to each other.

Since the pair of side frames 11 form the width of the seat base frame F, the side frames 11 are disposed while being separated from each other in the right and left direction and are disposed to extend in the front to back direction. Further, the member pipe 13 is attached to the rear side of the pair of side frames 11, and the pair of side frames 11 is connected to each other by the member pipe 13.

Further, the pan frame 12 is fixed and joined to the front side of the pair of side frames 11, and the pair of side frames 11 is connected to each other by the pan frame 12. More specifically, the ends of the pan frame 12 in the right and left direction are respectively fixed to flanges 11b and 11b respectively provided in the side frames 11.

The pan frame 12 is a metallic frame of which the upper surface is substantially formed in a flat rectangular shape to mainly support the thighs of the occupant C. Furthermore, as illustrated in FIG. 2, the upper surface of the pan frame 12 may be provided with a convex portion 12d which prevents a submarine (i.e., sinking) phenomenon generated by the rear collision or a positional deviation during the sitting operation.

Figure 3:
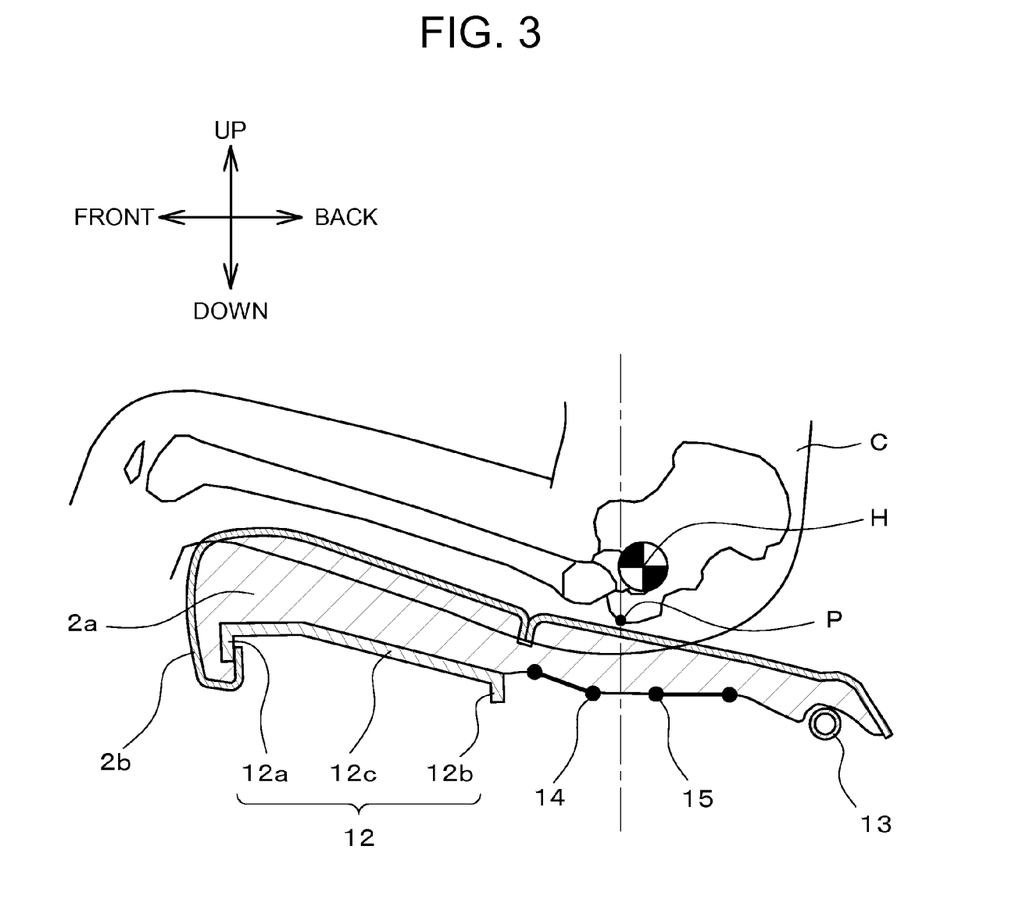
FIG. 3 is a side cross section view explanatory diagram illustrating a state where an occupant sits on a seat cushion according to an embodiment of the present invention.

Then, as illustrated in FIG. 3, the pan frame 12 includes a front bent portion 12a of which a front end is bent downward and a rear bent portion 12b of which a rear end is bent downward. Further, a support surface 12c of which an upper surface is substantially flat and is slightly inclined downward in the back direction is provided between the front bent portion 12a and the rear bent portion 12b. Furthermore, the ends of the support surface 12c in the right and left direction are respectively fixed to the flanges 11b and 11b of the side frames 11 (see FIG. 2). The support surface 12c comprises a concave portion 12f that is depressed downward and located at a rear end portion and a central portion in a right-to-left direction of the support surface.

The end of the skin material 2b is locked to the end (the lower end) of the front bent portion 12a of the pan frame 12. Furthermore, as a method of locking the skin material 2b and the front bent portion 12a to each other, an existing method such as a trim cord is used.

The front spring 14 and the rear spring 15 are disposed at the rear side in relation to the rear bent portion 12b of the pan frame 12. The front spring 14 and the rear spring 15 are laid across the side frames 11, and both ends of the front spring 14 and the rear spring 15 are respectively locked to lock portions 11c and 11c provided in the side frames 11. The lock portion 11c is provided in the side frame 11, two holes are formed while being separated from each other in the front to back direction, and a portion interposed between the holes bulges toward the inside of the side frame 11. Then, the end of the front spring 14 or the rear spring 15 is inserted from one hole so that a part of the spring follows the bulging portion and the end is inserted through the other hole.

In this way, the ends of the front spring 14 and the rear spring 15 are supported by the lock portion 11c having a bulging surface formed in the front to back direction.

The front spring 14 and the rear spring 15 are separated from each other by a predetermined distance (about 50 to 70 mm from the rear end of the front spring 14 to the front end of the rear spring 15) when the seat base frame F is directly viewed from the upside (that is, in planar view), and are disposed so that the extension directions are substantially parallel to each other.

Further, a position corresponding to an ischial tuberosity P of the occupant C is supported between the front spring 14 and the rear spring 15 (a space formed by the separation by the predetermined distance). That is, the front spring 14 and the rear spring 15 are disposed while being separated from each other so that both springs are not disposed below at least the position of the ischial tuberosity P.

The front spring 14 and the rear spring 15 are linear members that are formed in a corrugated shape (a zigzag shape) or the like, and mainly support the buttocks of the occupant C. Then, the ends of the front spring 14 and the rear spring 15 are respectively journaled to the side frames 11, and the cushion pad 2a is placed above the front spring 14 and the rear spring 15.

The planes (the planes formed in a corrugated shape) having the corrugated shapes of the front spring 14 and the rear spring 15 are respectively disposed to be slightly inclined with respect to the horizontal direction. Hereinafter, the inclination angle will be described in detail.

Inclination Angles of the Front Spring 14 and the Rear Spring 15

Figure 4:
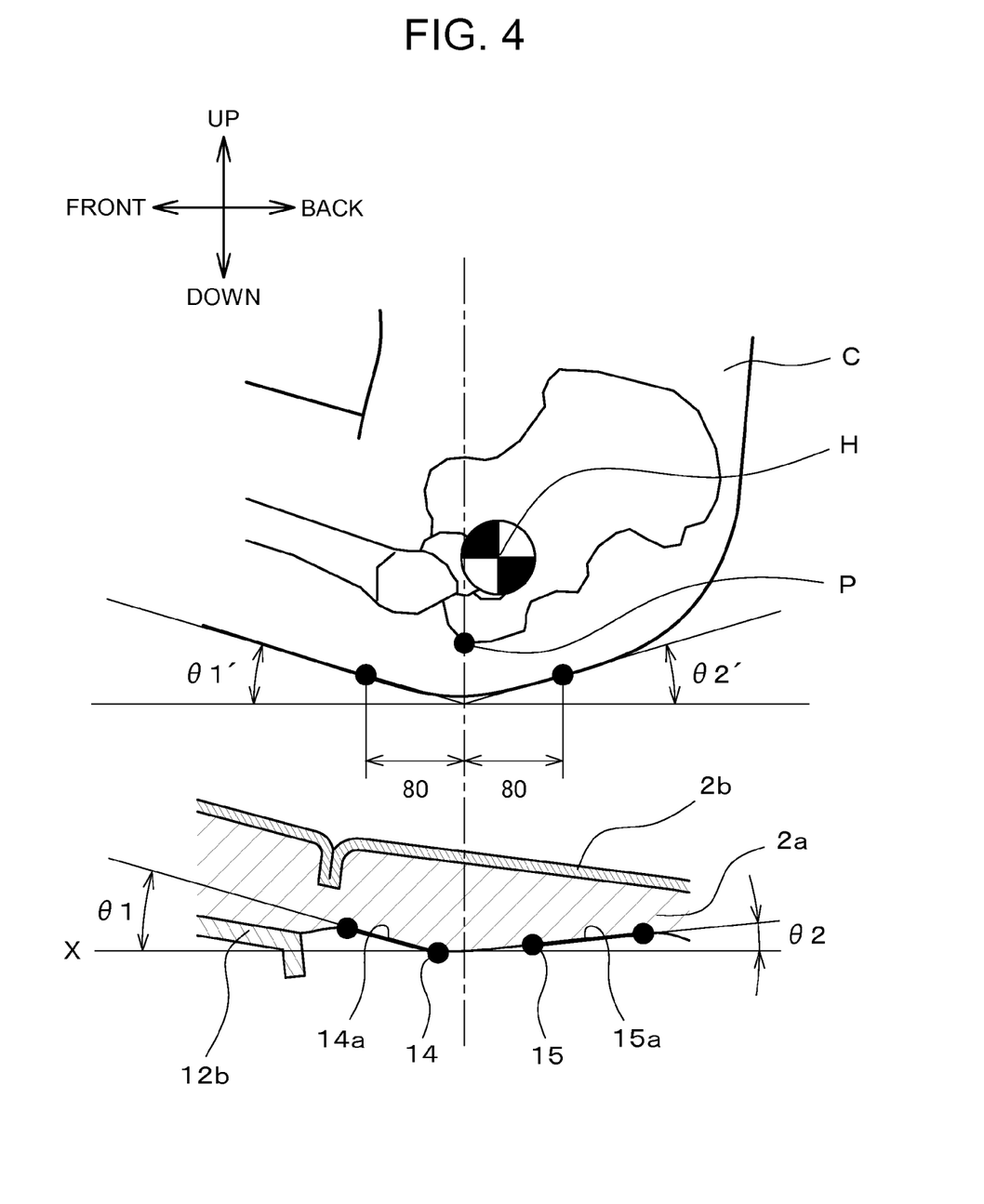
FIG. 4 is a side cross section view explanatory diagram illustrating a configuration of an elastic member according to an embodiment of the present invention.

FIG. 4 is a partially enlarged cross-sectional side view illustrating the seat cushion S2 cut in the front to back direction. Furthermore, in FIG. 4, the left side indicates the front side of the seat cushion S2, and the right side thereof indicates the rear side of the seat cushion S2.

As illustrated in FIG. 4, the respective corrugated planes of the front spring 14 and the rear spring 15 are disposed to be inclined with respect to the horizontal direction (the horizontal plane X). Then, the front spring 14 is disposed so that the rear side thereof is inclined downward (inclined rearward), and the rear spring 15 is disposed so that the front side thereof is inclined downward (inclined forward) or is disposed horizontally.

In other words, the front spring 14 is disposed so that a surface being in contact with the cushion pad 2a and supporting the pad (a pad contact surface 14a with respect to the cushion pad 2a) is inclined rearward with respect to the horizontal plane X, and the rear spring 15 is disposed so that a surface being in contact with the cushion pad 2a and supporting the pad (a pad contact surface 15a with respect to the cushion pad 2a) is inclined forward with respect to the horizontal plane X or is parallel to the horizontal plane X.

At this time, as illustrated in FIG. 4, when the degree of the small angle (the acute angle) is denoted by $\theta_1$ among the angles which are formed between the surface which is formed by the corrugated shape of the front spring 14 (the pad contact surface 14a with respect to the cushion pad 2a) and the horizontal plane X and the degree of the small angle (the acute angle) is denoted by $\theta_2$ among the angles formed between the surface which is formed by the corrugated shape of the rear spring 15 (the pad contact surface 15a with respect to the cushion pad 2a) and the horizontal plane X, the angles $\theta_1$ and $\theta_2$ are set as different angles.

It is desirable to set the angles $\theta_1$ and $\theta_2$ depending on the shape of the buttocks of the occupant C having a general physical size (more specifically, the angles $\theta_1'$ and $\theta_2'$ inclined with respect to the seat surface: $\theta_1'$ indicates the angle which is formed between the horizontal plane X and the line passing through the ischial tuberosity P of the occupant C and the buttocks of the occupant C separated by 80 mm from the ischial tuberosity P in the front direction and $\theta_2'$ indicates the angle which is formed between the horizontal plane X and the line passing through the ischial tuberosity P of the occupant C and the buttocks of the occupant C separated from the ischial tuberosity by 80 mm in the back direction), and the relation of $\theta_1 > \theta_2$ is established in the present invention. More specifically, it is desirable that the relation of $0 \le I \le 0.18$ be established when $I = \theta_2 / \theta_1$ (more specifically, $I = 0$ when the pad contact surface 15a is horizontal and the relation of $0 < I \le 0.18$ is established in the other cases).

Since the seat cushion S2 may easily follow the shape of the buttocks of the occupant C due to the front spring 14 and the rear spring 15 with such configurations, the occupant C may have a satisfactory fit comfort. Further, since the front spring 14 and the rear spring 15 are separated from each other by a predetermined distance, the ischial tuberosity P of the occupant C may be supported by a portion between the front spring 14 and the rear spring 15 (a portion obtained by the separation by the predetermined distance). As a result, the ischial pressure is reduced, and hence the seat cushion S2 providing a more satisfactory sitting comfort may be obtained.

More specifically, it is desirable that $\theta_1 = 17$ to $21°$ and $\theta_2 = 0$ to $3°$. In this way, the value of $\theta_1$ is set in consideration of the deflection of the cushion pad 2a and is set so that a difference in height between the pan frame 12 and the front end of the front spring 14 disposed at the front side is not large. When the value of $\theta_1$ is set to be larger or smaller than the above-described value, the occupant C feels a different in height at the boundary portion between the pan frame 12 and the front spring 14, and hence the sitting comfort is degraded. However, when the value of $\theta_1$ is set to the above-described value, the seat cushion S2 providing a satisfactory sitting comfort may be obtained. Furthermore, the value of $\theta_1$ is optimally $19°$ in consideration of the bending of the front spring 14.

Further, when the value of $\theta_2$ is set to be larger than the above-described value, the cushion pad 2a needs to be thinned. For this reason, the buttocks of the occupant C easily contact with the rear spring 15, and hence the sitting comfort is degraded. However, when the value of $\theta_2$ is set to the above-described value, the thickness of the cushion pad 2a may be ensured. Accordingly, the occupant C does not feel the sense of hitting a bottom during the sitting operation. Furthermore, in order to ensure the thickness of the cushion pad 2a, the value of $\theta_2$ is optimally $0°$.

Further, since the deflection amount of the cushion pad 2a may be absorbed by the expansion and the contraction of the spring due to the front spring 14 and the rear spring 15 with the above-described configuration, the sitting comfort is further improved.

Furthermore, a configuration has been described in which the front elastic member and the rear elastic member are respectively formed as S-shaped springs, but for example, an elastic member such as a band-shaped rubber member having a predetermined width may be used as the front elastic member and the rear elastic member. In a case where the band-shaped elastic member is used, the upper surface is disposed to be inclined with respect to the horizontal direction. That is, on the assumption that the small angle (the acute angle) is denoted by $\theta_1$ among the angles formed between the horizontal plane X and the upper surface of the elastic member disposed at the front side and the small angle (the acute angle) is denoted by $\theta_2$ among the angles formed between the horizontal plane X and the upper surface of the elastic member disposed at the rear side, the elastic members are disposed to satisfy the above-described values of $\theta_1$ and $\theta_2$.

Effect of the Front Spring 14 and the Rear Spring 15

As described above, since the front spring 14 is inclined rearward with respect to the horizontal plane X and the rear spring 15 is inclined forward with respect to the horizontal plane X (or is disposed horizontally), the seat cushion S2 has high following capability to the occupant C and has a satisfactory fit comfort.

Further, since the front spring 14 and the rear spring 15 have the above-described configurations, the seat cushion S2 has a satisfactory cushioning property without separately providing another shock absorbing member, and hence may reduce the vibration.

Further, since the front spring 14 and the rear spring 15 are disposed while being separated from each other by a predetermined distance in the seat cushion S2, it is possible to reduce the pressure (the ischial pressure) directly below the ischial tuberosity of which the sitting pressure is the highest during the sitting operation.

Accordingly, as described above, the seat cushion S2 has a satisfactory fit comfort, may reduce the vibration, and may further reduce the ischial pressure. Accordingly, the occupant C may feel an extremely satisfactory sitting comfort. Further, since the seat cushion S2 has a simple and light-weight configuration without increasing the number of components, the working efficiency when assembling the seat cushion S2 (the vehicle seat S) to the vehicle is improved.

Structure of the Pan Frame 12

Figure 5:
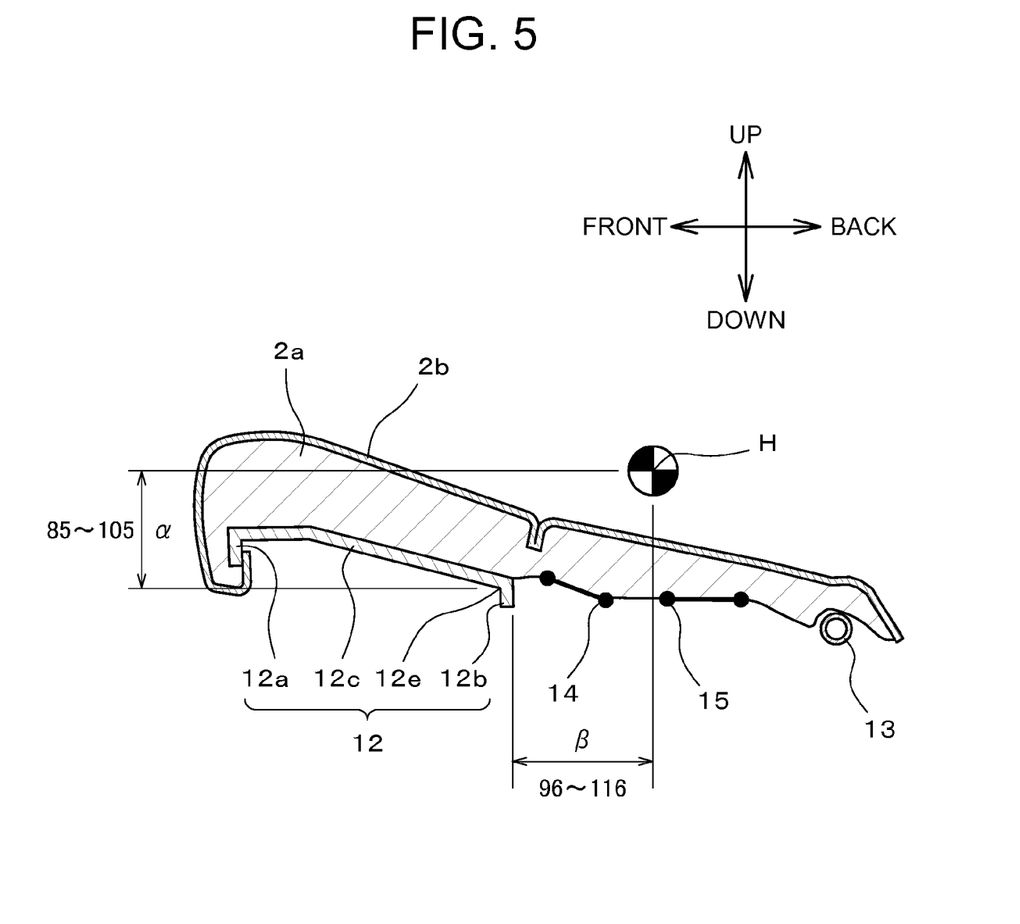
FIG. 5 is a side cross section explanatory diagram illustrating a configuration of a plate-shaped frame according to an embodiment of the present invention.

FIG. 5 illustrates a cross-sectional view obtained by cutting the seat cushion S2 in the front to back direction. Furthermore, in FIG. 5, the left side indicates the front side of the seat cushion S2 and the right side indicates the rear side of the seat cushion S2.

As illustrated in FIG. 5, the position of a rear end 12e of the support surface 12c of the pan frame 12 (that is, the boundary portion between the support surface 12c and the rear bent portion 12b) is defined based on the position of the hip point H of the three-dimensional mannequin.

As illustrated in FIG. 5, it is desirable to provide the rear end 12e of the pan frame 12 so that a ratio of $\alpha$ with respect to $\beta$, that is, $\alpha/\beta$ satisfies the relation of $0.73 \le \alpha/\beta \le 1.09$ when the height from the rear end 12e to the hip point H (the distance in the vertical direction) is denoted by $\alpha$ and the distance between the rear end 12e and the hip point H in the front to back direction (here, the hip point H is located behind the rear end 12e) is denoted by $\beta$.

When the rear end 12e of the pan frame 12 is provided at the above-described position, the vibration characteristics in the vehicle running state are improved, and the satisfactory sitting comfort may be obtained without feeling a sense of a foreign body. Furthermore, at this time, the phrase "vibration characteristics are improved" indicates that the resonance magnification decreases and the resonance frequency increases. The vibration characteristics will be described below in detail.

Regarding the values of the α and the β, more specifically, the values of about α=85 to 105 mm and β=96 to 116 mm are desirable. When the pan frame 12 is attached to the side frames 11 so that the values of the α and the β have the above-described ranges, the vibration characteristics are improved.

When α exceeds 105 mm or β exceeds 116 mm, the vibration characteristics may not be improved. Further, when α is smaller than 85 mm and β is smaller than 96 mm, the occupant's buttocks feel the sense of hitting the bottom surface or feel the foreign body during the sitting operation, and hence the sitting comfort is degraded.

As described above, when the position of the rear end 12e of the pan frame 12 is set in the above-described range with respect to the hip point H of the three-dimensional mannequin, the area of the pan frame may be decreased compared to the configuration in which the heavy-weight pan frame is installed in the entire surface. As a result, the seat base frame F may be decreased in weight and the vibration characteristics in the vehicle running state or the sitting comfort of the occupant C may be improved.

Further, when the rear end 12e of the pan frame 12 is provided in the above-described range and the front spring 14 and the rear spring 15 are provided with the above-described configuration, the seat cushion S2 of the present invention may improve the vibration characteristics. Also, the cushion pad 2a may easily follow the human body (the buttocks) of the occupant C and the ischial pressure is reduced. Accordingly, the occupant C may feel an extremely satisfactory sitting comfort. Further, since there is no need to provide a complex device as the configuration of improving the following capability of the cushion pad 2a, the weight does not increase.

EXAMPLE AND COMPARATIVE EXAMPLE

Hereinafter, Example and Comparative Example of the present invention will be described by referring to FIGS. 6 to 9.

Furthermore, in FIGS. 6 to 9, "Example" is defined as the seat cushion S2 of the embodiment of the present invention, and $\theta_1$ is set to 19° and $\theta_2$ is set to 0°. Further, the relation of α=95 mm and β=106 mm is set.

"Comparative Example" is defined as having a configuration in which four S-shaped springs are provided in the front to back direction instead of the front spring 14 and the rear spring 15 of the present invention. Further, when "Comparative Example" is compared with Example, the pan frame is small in the front to back direction (that is, β is larger than 116 mm) and the height from the rear end of the pan frame to the hip point H is large (that is, α is larger than 105 mm). Specifically, the relation of α=115 mm and β=153 mm is set.

Figure 6:
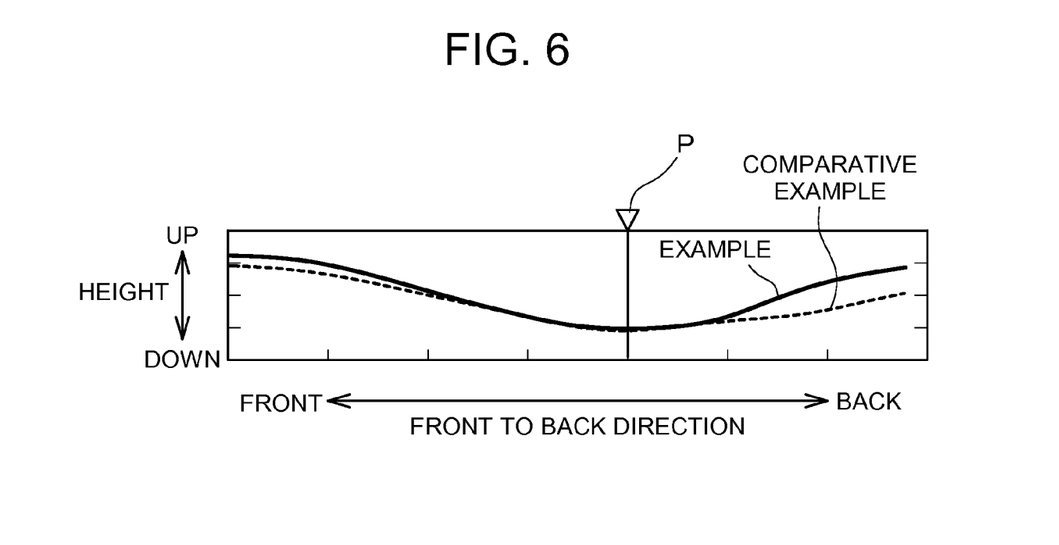
FIG. 6 is a graph illustrating sitting shapes of seat cushions according to Example and Comparative Example of the present invention.

FIG. 6 is a graph illustrating the sitting shape of the seat cushion S2 (the displacement amount in the height direction) when the occupant C (the subject) sits on the seat cushion. Here, the following capability (the fit comfort) with respect to the human body (the buttocks) of the occupant C is illustrated when the horizontal axis indicates the front to back direction of the seat cushion S2 and the vertical axis indicates the displacement amount of the upper surface (the occupant contact surface) of the seat cushion S2 in the height direction. Furthermore, the reference numeral P of FIG. 6 indicates the position of the ischial tuberosity P of the occupant C.

This measurement is performed by using a strain gauge type load measuring device (manufactured by Minebea Co., Ltd.) while a stainless pipe (a thickness=0.4 mm and a width=40 mm) is laid in the front to back direction of the seat cushion S2 and the subject is seated on the seat cushion S2, and the sitting shape is compared. Furthermore, the subject at this time is the occupant which has a value that is the closest to the average value of the body shapes (the buttocks shapes) of forty people.

As a result, the displacement amount at the position of the ischial tuberosity P is the same in Example and Comparative Example, and the occupant C is supported with the smaller displacement at the front and rear ends of the seat cushion S2 in the Example. Accordingly, it is proved that the seat cushion S2 described herein has a high contour following capability, that is, a fit comfort with respect to the occupant C.

Accordingly, it is proved that the cushion pad 2a may easily follow the contour of the occupant C by employing a configuration in which the front spring 14 and the rear spring 15 are provided in the right and left direction, the front spring 14 is inclined rearward, and the rear spring 15 is inclined forward compared to the seat cushion in which the elastic member supporting the cushion pad 2a is provided in the front to back direction.

It is proved that the buttocks of the occupant may be satisfactorily supported at the front and rear sides of the ischial tuberosity P by employing a configuration in which the angle $\theta_1$ is set to 19° and the angle $\theta_2$ is set to 0° as the angles formed by the pad contact surface 14a of the front spring 14 and the pad contact surface 15a of the rear spring 15 with respect to the horizontal plane X.

Figure 7:
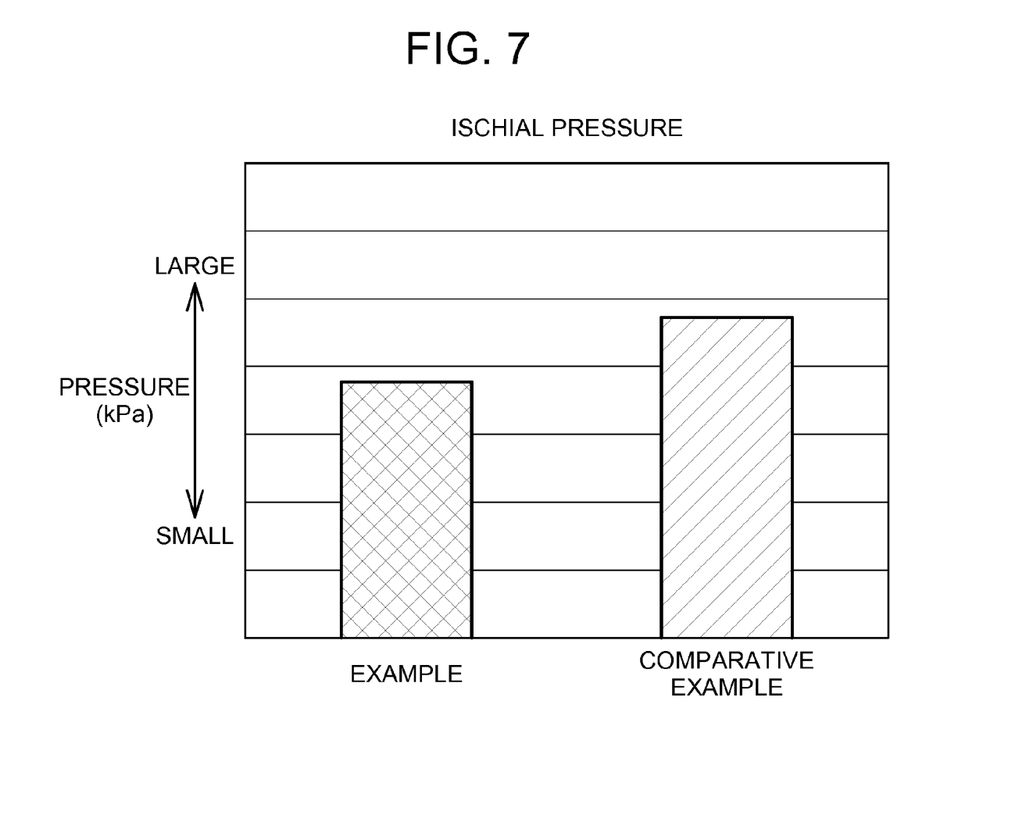
FIG. 7 is a graph illustrating magnitudes of ischial pressures in the seat cushions according to Example and Comparative Example of the present invention.

FIG. 7 is a graph illustrating the ischial pressure in the seat cushion S2 when the occupant C sits on the seat cushion. This measurement is performed by measuring the pressure generated when the subject sits on the seat cushion using a clothing pressure gauge (manufactured by AMI Techno) after a sensor is attached onto the cushion pad 2a (the skin material 2b) (more specifically, a portion corresponding to the ischial tuberosity P).

As a result, it is proved that the ischial pressure of Example is noticeably smaller than the ischial pressure of Comparative Example. Accordingly, it is proved that the ischial pressure largely influencing the sitting comfort is reduced by employing a configuration in which the front spring 14 and the rear spring 15 are provided in the right and left direction to be separated from each other.

In Comparative Example, in which the elastic member is provided in the front to back direction, the elastic member may not be disposed to avoid the ischial tuberosity, and hence it is difficult to reduce the ischial pressure. Accordingly, in the seat cushion S2 of and embodiment of the present invention described herein, the front spring 14 and the rear spring 15 are disposed while being separated from each other by a predetermined distance, and hence the ischial tuberosity P may be located at the portion formed by the separation. Accordingly, the sitting comfort is improved.

Figure 8:
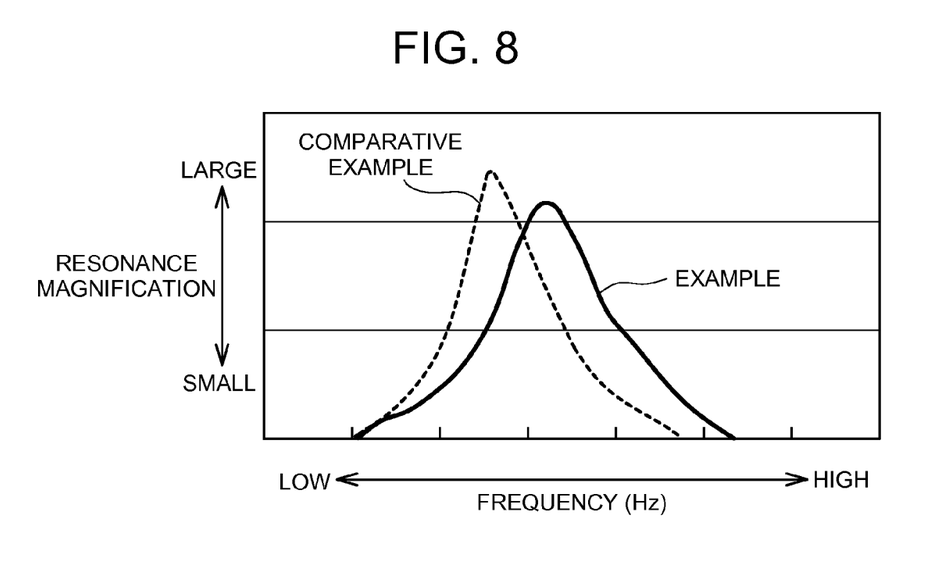
FIG. 8 is a graph illustrating resonance magnifications of the seat cushions according to Example and Comparative Example of the present invention.

FIG. 8 is a graph illustrating a result of a forced vibration test (a vibration characteristic test) of the seat cushion S2. The horizontal axis indicates the frequency and the vertical axis indicates the resonance magnification (transmission rate).

This measurement is performed based on the term of JASO B407-87 "6.4 Vibration Test".

As a result, in the seat cushion S2 of Example, it is proved that the resonance magnification decreases, the frequency is shifted to the high frequency, and the resonance point is largely shifted from the resonance zone of the human body of the occupant C.

In Comparative Example, in which the pan frame is formed as having a comparatively small size in the front to back direction (that is, the rear end of the pan frame is provided at a position far from the hip point H), the resonance magnification is high and the resonance point is not easily shifted from the resonance zone of the human body of the occupant C.

Accordingly, since the seat cushion S2 of sets the position of the rear end 12e of the pan frame 12 as described above, the vibration characteristics are improved. That is, the seat cushion S2 may shift the resonance point of the seat from the resonance zone of the human body of the occupant C and hence may further reduce the resonance magnification. As a result, the seat cushion S2 described herein may effectively reduce the resonance in the vehicle running state and provides a satisfactory sitting comfort.

Further, in the seat cushion of Comparative Example, the elastic member provided in the seat base frame is installed in the right and left direction and the number thereof is four. However, in the present seat cushion S2, the number of the elastic members decreases and the installation direction is set as the front to back direction. Accordingly, it is expected that the vibration characteristics are further improved.

Figure 9:
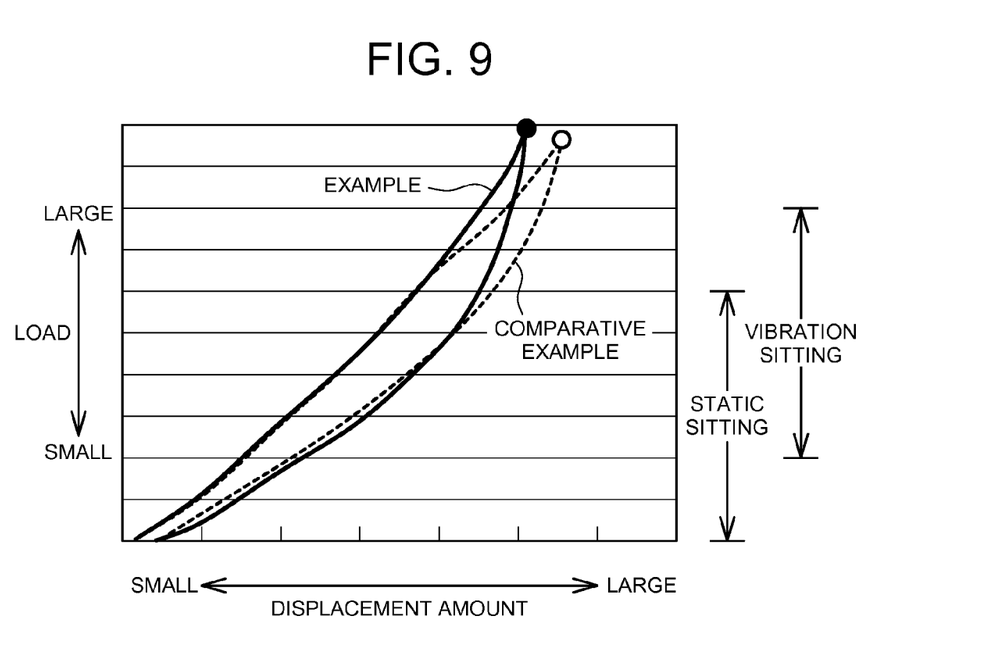
FIG. 9 is a graph illustrating load characteristics of the seat cushions according to Example and Comparative Example of the present invention.

FIG. 9 is a graph illustrating a result of a load deflection test (a load characteristic test) of the seat cushion S2. The horizontal axis indicates the displacement amount of the seat cushion S2 and the vertical axis indicates the load applied to the seat cushion S2.

This measurement is performed based on the term of JASO B407-87 "6.1 Load Test".

As a result, in the seat cushion S2 of Example, the hardness is substantially the same in the load range of the static sitting (the normal sitting) region as that of the seat cushion of Comparative Example, but the hardness in the load range of the vibration sitting region is larger than that of the seat cushion of Comparative Example.

Accordingly, since the present seat cushion S2 sets the position of the rear end 12e of the pan frame 12 as described above, the high hardness with respect to a high load is achieved. As a result, the vibration characteristics of the seat cushion S2 of the present invention are improved, and hence the satisfactory sitting comfort may be obtained.

Other Embodiments

Furthermore, in the above-described embodiments, the seat base frame F of the front seat of the automobile has been described as a specific example, but the present invention is not limited thereto. For example, the same configuration may be also applied to the seat base frame of the rear seat.

TABLE OF REFERENCE NUMERALS

| | |
|---|---|
| C | occupant (three-dimensional mannequin) |
| H | hip point (H point) |
| P | ischial tuberosity |
| S | vehicle seat |
| S1 | seatback |
| S2 | seat cushion |
| S3 | headrest |
| F | seat base frame |
| X | horizontal plane |

-continued

TABLE OF REFERENCE NUMERALS

| | |
|---|---|
| 1a, 2a, 3a | cushion pad (pad material) |
| 1b, 2b, 3b | skin material |
| 11 | side frame |
| 11b | flange |
| 11c | lock portion |
| 12 | pan frame (plate-shaped frame) |
| 12a | front bent portion |
| 12b | rear bent portion |
| 12c | support surface |
| 12d | convex portion |
| 12e | rear end |
| 12f | concave portion of support surface |
| 13 | member pipe (connection member) |
| 14 | front spring (front elastic member) |
| 14a | pad contact surface |
| 15 | rear spring (rear elastic member) |
| 15a | pad contact surface |
| 20 | headrest pillar |

The invention claimed is:

1. A seat cushion comprising:
a seat base frame;
a cushion pad which is placed on the seat base frame; and
a skin material which covers the seat base frame and the cushion pad, wherein:
the seat base frame comprises:
a pair of side frames that extends in a front to back direction;
a front elastic member that is installed in the pair of side frames and is in contact with the cushion pad;
a rear elastic member that is separated from the front elastic member by a predetermined distance and is in contact with the cushion pad; and
a plate-shaped frame installed in the pair of side frames,
a pad contact surface of the front elastic member that is inclined rearward with respect to a horizontal plane;
a pad contact surface of the rear elastic member that is inclined forward with respect to the horizontal plane or parallel thereto;
a rear end of the plate-shaped frame is disposed in front of the front elastic member in a seat front-to-rear direction;
the front elastic member and the rear elastic member are disposed while being separated from each other by a predetermined distance such that an ischial tuberosity of an occupant is positioned at a space between the front elastic member and the rear elastic member; and
a front end of the front elastic member is located above a level of the rear end of the plate-shaped frame in a seat top-to-bottom direction.

2. The seat cushion according to claim 1, wherein the rear end of the plate-shaped frame is provided to satisfy a relation of $0.73 \leq \alpha/\beta \leq 1.09$ when a height from the rear end to a hip point of a three-dimensional mannequin based on SAE J-826 is denoted by $\alpha$, a distance from the rear end to the hip point in the front to back direction is denoted by $\beta$, and a ratio between the $\alpha$ and the $\beta$ is denoted by $\alpha/\beta$.

3. The seat cushion according to claim 2, wherein:
the $\alpha$ is in a range of 85 to 105 mm; and
the $\beta$ is in a range of 96 to 116 mm.

4. The seat cushion according to claim 1, wherein:
the plate-shaped frame comprises a pan frame having a support surface for supporting the occupant;
a lock portion for locking the front elastic member is provided in each of the pair of side frames; and both end portions of the front elastic member are locked to the lock portions respectively to extend from a back to a front direction.

5. The seat cushion according to claim 1, wherein:
the plate-shaped frame comprises a pan frame;
the pan frame comprises a support surface for supporting the occupant; and
the support surface comprises a concave portion that is:
  depressed downward; and
  located at a rear end portion and a central portion in a right-to-left direction of the support surface.

6. A seat cushion comprising:
a seat base frame;
a cushion pad which is placed on the seat base frame; and
a skin material which covers the seat base frame and the cushion pad, wherein:
the seat base frame comprises:
  a pair of side frames that extends in a front to back direction;
  a front elastic member that is installed in the pair of side frames and is in contact with the cushion pad;
  a rear elastic member that is separated from the front elastic member by a predetermined distance and is in contact with the cushion pad; and
  a plate-shaped frame installed in the pair of side frames,
a pad contact surface of the front elastic member that is inclined rearward with respect to a horizontal plane;
a pad contact surface of the rear elastic member that is inclined forward with respect to the horizontal plane or parallel thereto;
the plate-shaped frame is disposed in front of the front elastic member;
the front elastic member and the rear elastic member are disposed while being separated from each other by a predetermined distance such that an ischial tuberosity of an occupant is positioned at a space between the front elastic member and the rear elastic member; and
when a degree of an acute angle formed between the pad contact surface of the front elastic member and the horizontal plane is denoted by $\theta_1$ and a degree of an acute angle formed between the pad contact surface of the rear elastic member and the horizontal plane is denoted by $\theta_2$, a relation of $\theta_1 > \theta_2$ is established.

7. The seat cushion according to claim 6, wherein when a ratio between the $\theta_1$ and the $\theta_2$ is denoted by $\theta_2/\theta_1$, a relation of $0 \leq \theta_2/\theta_1 \leq 0.18$ is established.

8. The seat cushion according to claim 7, wherein:
the $\theta 1$ is in a range of 17 to 21°; and
the $\theta 2$ is in a range of 0 to 3°.

9. The seat cushion according to claim 8, wherein a rear end of the plate-shaped frame is provided to satisfy a relation of $0.73 \leq \alpha/\beta \leq 1.09$ when a height from the rear end to a hip point of a three-dimensional mannequin based on SAE J-826 is denoted by $\alpha$, a distance from the rear end to the hip point in the front to back direction is denoted by $\beta$, and a ratio between the $\alpha$ and the $\beta$ is denoted by $\alpha/\beta$.

10. The seat cushion according to claim 9, wherein:
the $\alpha$ is in a range of 85 to 105 mm; and
the $\beta$ is in a range of 96 to 116 mm.

11. The seat cushion according to claim 7, wherein a rear end of the plate-shaped frame is provided to satisfy a relation of $0.73 \leq \alpha/\beta \leq 1.09$ when a height from the rear end to a hip point of a three-dimensional mannequin based on SAE J-826 is denoted by $\alpha$, a distance from the rear end to the hip point in the front to back direction is denoted by $\beta$, and a ratio between the $\alpha$ and the $\beta$ is denoted by $\alpha/\beta$.

12. The seat cushion according to claim 11, wherein:
the $\alpha$ is in a range of 85 to 105 mm; and
the $\beta$ is in a range of 96 to 116 mm.

13. The seat cushion according to claim 6, wherein a rear end of the plate-shaped frame is provided to satisfy a relation of $0.73 \leq \alpha/\beta \leq 1.09$ when a height from the rear end to a hip point of a three-dimensional mannequin based on SAE J-826 is denoted by $\alpha$, a distance from the rear end to the hip point in the front to back direction is denoted by $\beta$, and a ratio between the $\alpha$ and the $\beta$ is denoted by $\alpha/\beta$.

14. The seat cushion according to claim 13, wherein:
the $\alpha$ is in a range of 85 to 105 mm; and
the $\beta$ is in a range of 96 to 116 mm.

15. A vehicle seat comprising:
the seat cushion according to claim 1; and
a seatback.

* * * * *